(12) United States Patent
Byerly

(10) Patent No.: US 10,194,650 B2
(45) Date of Patent: Feb. 5, 2019

(54) TURKEY SENSOR

(71) Applicant: Steven Foster Byerly, Siegel, PA (US)

(72) Inventor: Steven Foster Byerly, Siegel, PA (US)

( * ) Notice: Subject to any disclaimer, the term of this patent is extended or adjusted under 35 U.S.C. 154(b) by 0 days.

(21) Appl. No.: 14/693,954

(22) Filed: Apr. 23, 2015

(65) Prior Publication Data
US 2016/0015023 A1 Jan. 21, 2016

Related U.S. Application Data

(60) Provisional application No. 61/984,153, filed on Apr. 25, 2014.

(51) Int. Cl.
*A01M 31/00* (2006.01)
*H04R 1/02* (2006.01)
*H04R 5/04* (2006.01)
*H04R 1/08* (2006.01)
*H04R 1/40* (2006.01)
*H04R 3/00* (2006.01)

(52) U.S. Cl.
CPC ........... *A01M 31/002* (2013.01); *H04R 1/028* (2013.01); *H04R 5/04* (2013.01); *H04R 1/086* (2013.01); *H04R 1/406* (2013.01); *H04R 3/005* (2013.01); *H04R 2499/11* (2013.01)

(58) Field of Classification Search
CPC ........ A01M 31/002; H04R 1/028; H04R 5/04
See application file for complete search history.

(56) References Cited

U.S. PATENT DOCUMENTS

| | | | | |
|---|---|---|---|---|
| 5,452,364 | A * | 9/1995 | Bonham | G01V 1/001 381/122 |
| 6,069,958 | A * | 5/2000 | Weisel | H04R 3/005 381/122 |
| 7,534,056 | B2 * | 5/2009 | Cross | F16M 11/10 348/143 |
| 9,089,123 | B1 * | 7/2015 | Thomas | A01M 29/16 |
| 2005/0049877 | A1 * | 3/2005 | Agranat | A01K 11/008 704/270 |
| 2007/0033010 | A1 * | 2/2007 | Jones | A01K 29/005 704/201 |

* cited by examiner

*Primary Examiner* — Regina N Holder

(57) ABSTRACT

A turkey sensor that is used to scout an area without the hunter being present. The device locates wildlife by recording their vocals primarily turkey and duck roosts in the first 30 minutes of daylight in the early morning.

7 Claims, 4 Drawing Sheets

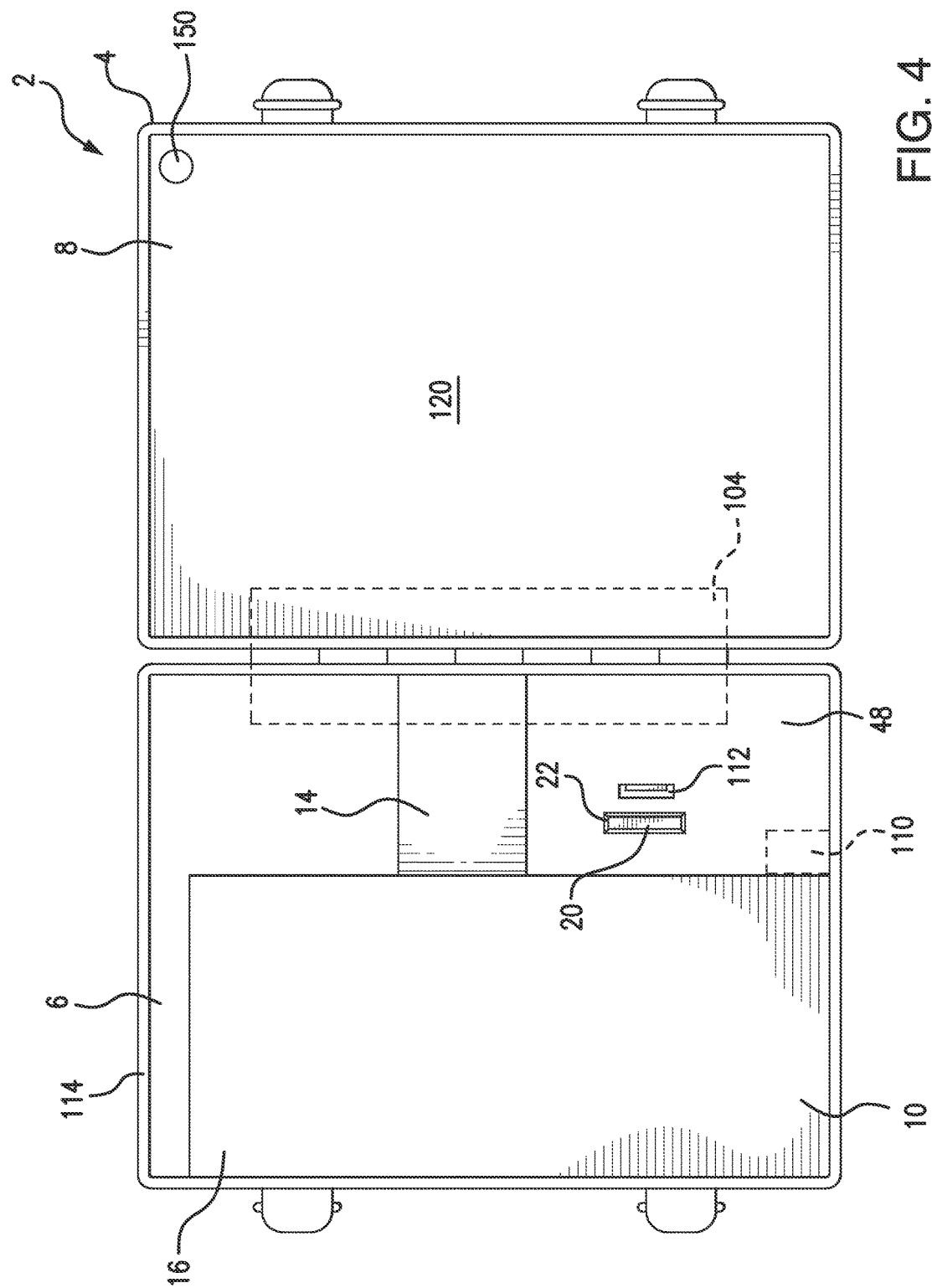

TURKEY SENSOR

This application is a Utility Application claiming priority from U.S. Provisional application Ser. No. 61/984,153, filed Apr. 25, 2014.

BACKGROUND OF THE INVENTION

The applicant is unaware of any prior art.

THE INVENTION

The present invention is a method of scouting and locating wildlife. The method comprises placing a sensing device at a desired wildlife location, activating the sensor device and after a predetermined period of time, deactivating the sensor device and relocating the sensor device to a different location in the wildlife location. Then reactivating the sensor device then after a predetermined period of time, collecting the sensor device and accessing the sensor device to determine wildlife activity collected by the sensor device.

The sensor device is comprised of a hinged housing that comprises a front compartment and a back compartment. Also contained in the back component is an electrical power source and connected electrically to the electrical power source are controls, a display screen, a speaker and an SD card. Contained in the front compartment, a parabolic microphone. The housing has external means to attach the housing to a support.

One embodiment of the turkey sensor has a timer. Another embodiment has a light sensor. The turkey sensor in yet another embodiment has playback capability. And yet another embodiment the turkey sensor has a recording capability.

BRIEF DESCRIPTION OF THE DRAWINGS

FIG. 4 is another embodiment that allows the user to place their own recording device within the housing.

DETAILED DESCRIPTION OF THE DRAWINGS

Figure 1:
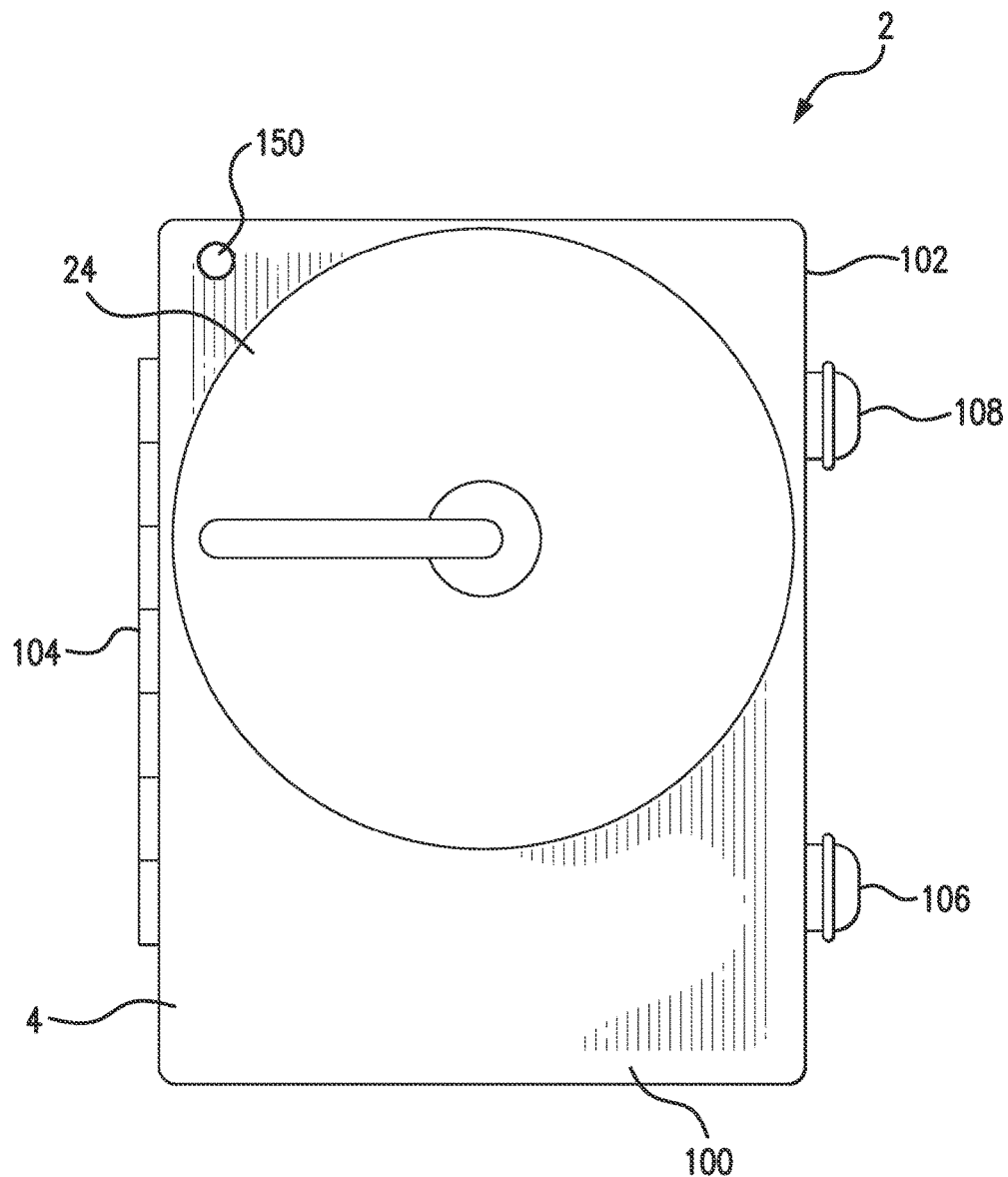
FIG. 1 shows the turkey sensor from the front.

FIG. 1 shows the turkey sensor 2 from the front. The turkey sensor 2 has a hinged housing 4. The turkey sensor 2 is typically mounted to the ground but any acceptable means of securing the device 2 to a tree is acceptable. Other means of securing the device 2 to objects would include but are not limited to a bungee, rope, wire, tie wrap, Velcro, cord, strap with buckles and any other means to secure the turkey sensor 2 to an object or to the ground.

Also shown is the parabolic microphone 24 that is use to sense vocalization of the targeted species. Each side 100 and 102 both have a parabolic microphone 24. The outer housing 4 is comprised of a front compartment 6 and a back compartment 8 (seen in FIG. 3). The two halves or compartments 100 and 102 are hinged by a hinge 104. The two halves 100 and 102 have latches 106 and 108 that securely close the two halves together making a weather tight seal. The outer surface has the light sensor 150.

Figure 2:
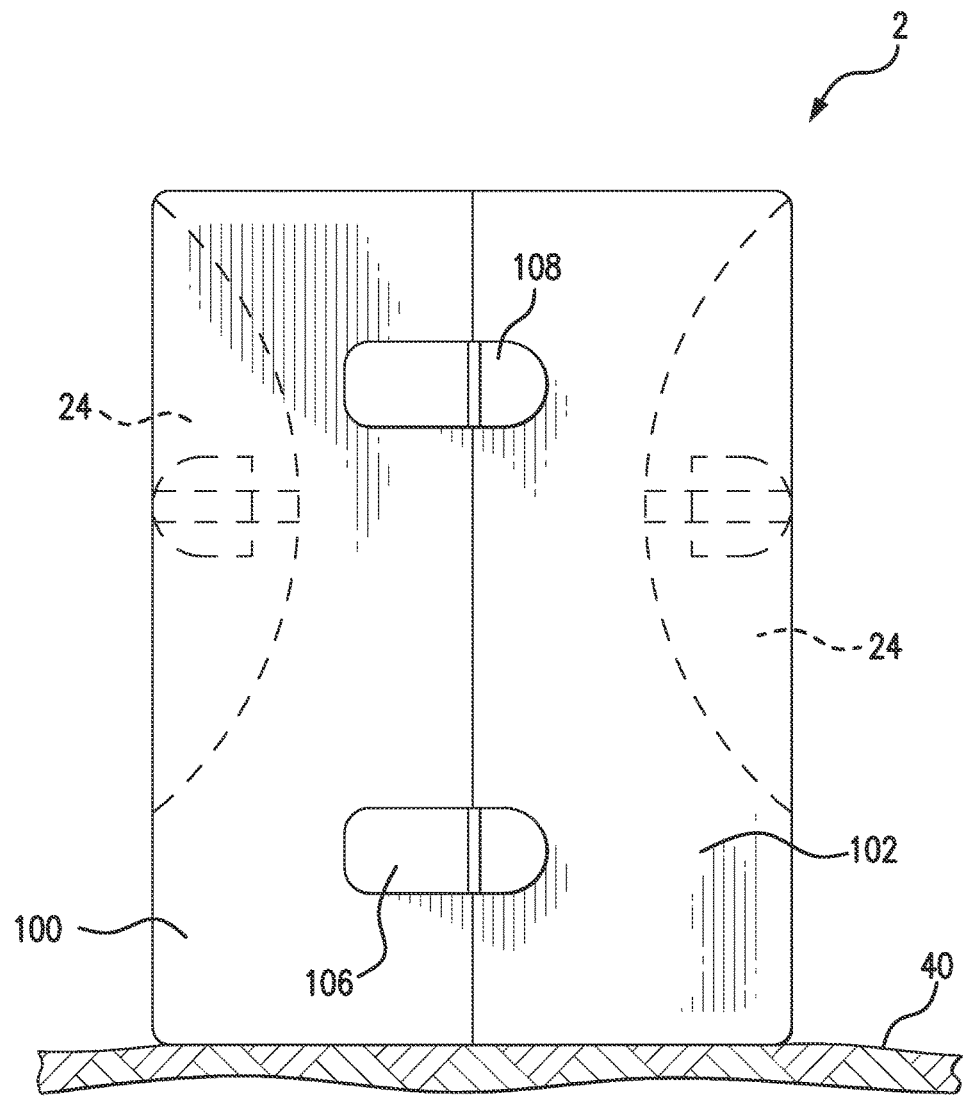
FIG. 2 shows the turkey sensor from the side.

FIG. 2 shows the turkey sensor 2 from the side. The turkey sensor 2 has a housing 4 that is comprised of a front half 100 and a back half 102. The front half 100 contains a parabolic microphone 24 for sensing and recording the turkey and wild fowl sounds as they become active from their roosting behavior of night. The back half 102 also contains a parabolic microphone 24 for sensing and recording the turkey and wild fowl sounds as they become active from their roosting behavior of night. As the sun beings to rise these birds become active and recording of their activities provide insight into their morning rituals. This information is then used to strategize possible scenarios to capture them.

The turkey sensor 2 attached in a location that is thought to have turkey or wildfowl present. The preferred method of deployment is to place the sensor 2 directly on the ground 40. The sensor 2 can be place anywhere the user desires. Here the parabolic microphones 24 of each of the front half 100 and the second half 102 are shown. The sensor 2 is capable of picking up audio in a panoramic zone due to having dual parabolic microphones 24. This also enable the user to directionally locate the source of the audio. The latches 106 and 108 are also visible.

Figure 3:
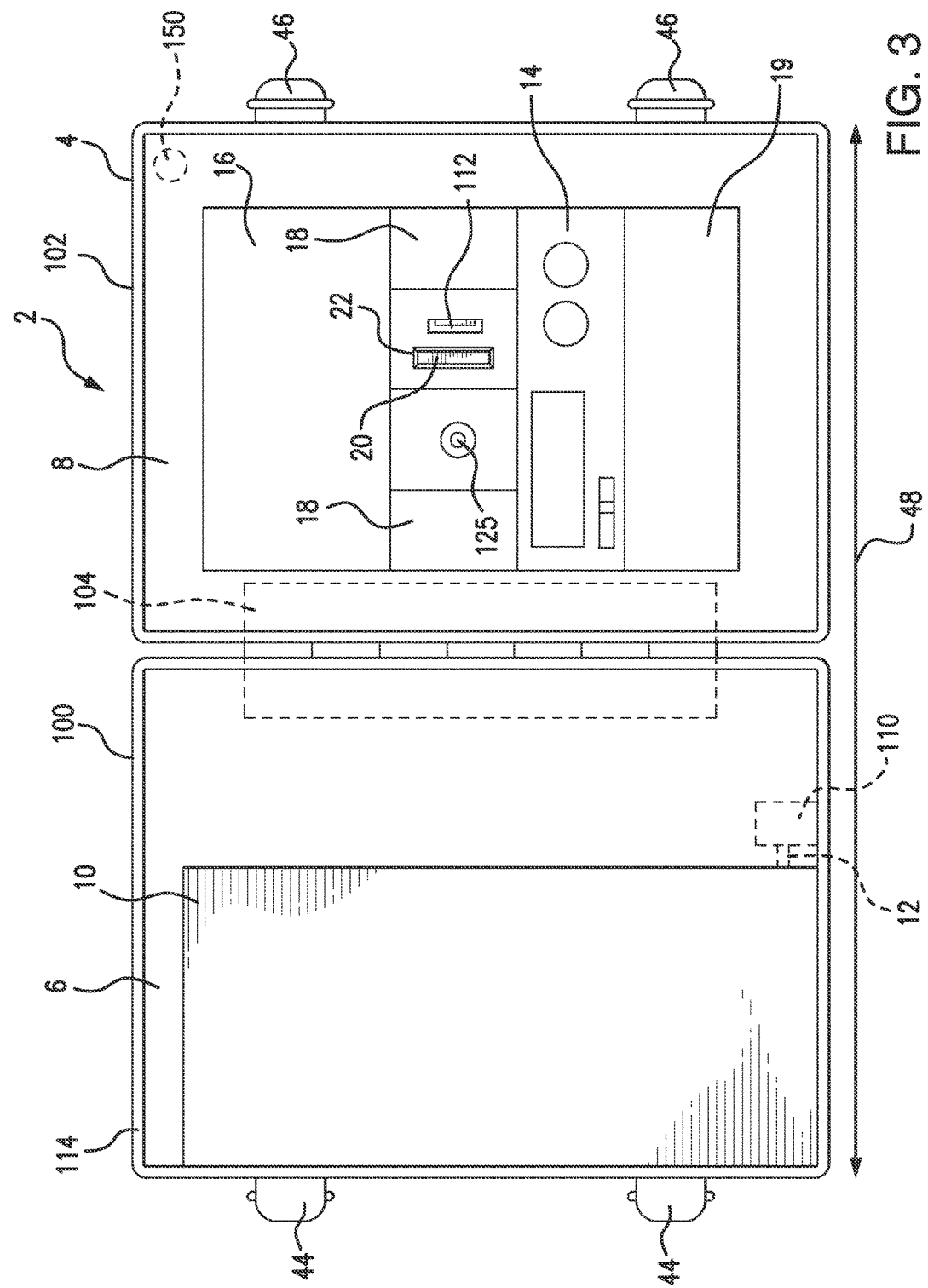
FIG. 3 shows the turkey sensor open.

FIG. 3 shows the turkey sensor 2 open. The turkey sensor 2 has a first side 100 that has front compartment 6 which contains the parabolic microphone 24. Also located in the first side or half is the power source 10. The power sources 10 is a battery. This battery is either a group of standard batteries or a rechargeable battery. There is also a recharging port 110. The second compartment 8 contains the electronics 48 that run the sensor 2 and another parabolic microphone 24. The electronics include part of the electrical connections 12, controls 14, display screen 16, speakers 18, SD card slot 20 and SD card 22. There is also a USB port 112. The device 2 also has an internal memory.

The power source 10 is electrically connected by part of the electrical connections 12 to the controls 14. The display screen 16 displays the controls 14 that allow the user to set up the device to sense sound, record sounds and play back sounds.

The speakers 18 allows the turkey sensor 2 to play the recorded sound. The sounds are recorded on a digital recorder 19 and stored on the SD card 20 that resides in the SD card slot 22. The device 2 is equipped to record to the on board memory and an external memory device through the USB port 112 simultaneously.

The front half 6 has two diametrically opposed male snap locking mechanism 46 that align with two female snap locking mechanisms 44 that when snapped together form latch 106 and 108 that lock the front compartment 6 to the back compartment 8. The front compartment 6 and the back compartment 8 are hinged by a hinge 104 that allows the sensor 2 to be closed and snapped together. There is also a weather stripping 114 that is sandwiched between the first half 100 and the second half 102. This strip 114 is a rubber material that when the first half 100 and the second half 102 are joined together provide the weather tight seal. Also visible is the headphone jack 125. The jack 125 allows the user to listen to the recorder through a set of headphones.

There is an embodiment where the electronics include a light sensor 150 for detecting dawn and dusk when the fowl are their most active. In another embodiment the electronics include a timer.

Once the sound enters the microphone it must be amplified to bolster the signal to the recorder 19. The reasoning behind this is the signal is too weak to replay.

Once the device 2 is in place, it is set to be sound activated to record activity during the day or night time. The recorder is set to activate at a giving decibel level. There are multiple levels of sound level activation. When there are periods of higher activity the decibel level needs to be set higher to eliminate background noise. The lower activity would require a higher decibel level to pick up any noise.

The main embodiment is a battery powered listening device with rechargeable capabilities used to locate and pattern movements of wildlife by recording their vocalization without being present at the location being scouted, primarily but not limited to pre-sunrise and early morning hours.

The device 2 is to be used in conjunction with external software that is loaded onto the user's computer to review external files. The program has the capability to download the recorder's internal memory files. The program has the capability to communicate with the device to change the recorder's settings. The control of the external program has the controls to manipulate these functions. These functions control the program and include but are not limited to a spectrum analyzer, high speed playback, skip, stop, pause, fast forward, reverse, fast wind, play, erase, save, copy, paste and file transfer.

FIG. 4 is another embodiment that allows the user to place their own recording device within the housing 4 at 120. Specifically the back half 8. This allows the user to have a less expensive model by furnishing their own recorder a whatever price level they choose. This embodiment still has the display screen 16 and the electronic controls 14. Also visible here are the display screen 16 and the electronics 48. The battery 10 is the power source and the water tight seal 114 is also present. There is a SD card 22 and slot 20 to record directly to the SD card 22 if applicable. Also the recorder 19 in compartment 120 will have an on board memory and USB port 112 for more external storage.

In another embodiment the turkey sensor 2 is used to monitor game and predator activity during day or night. The device 2 is set to start recording when vocalization is detected. The detection is capable of recording all animals that make vocal sounds, not just fowl.

Another embodiment contains external software for playback and manipulation of sounds that are recorded.

Another embodiment has software that enables the user to set the device to only detect a certain animal that is sought.

Another embodiment the device has digital capabilities used to locate and pattern movements of wildlife by recording their vocals without being present at the location being scouted, primarily but not limited to pre-sun rise and early morning.

The device 2 will use one or multiple parabolic stereo microphones 24 with windshields. These windshield are wind blocks that reduce wind interaction with the microphones. The device 2 can use a one channel system (mono) or a multi-channel system (stereo). A one channel system cannot identify direction of vocals. A multi-channel system will identify direction of the vocals and is preferred for hunting purposes.

Headphones or speakers 18 are used to review the recording to identify the direction of the vocalization. A spectrum analyzer is also use to give visual aid to help identify the direction of the vocals.

The channels must be amplified to boost the signal to have an audible quality clear enough to be heard.

Sound filters are used to select frequencies of targeted species and eliminate unwanted species such as song birds.

The programmable timer with sleep mode is used to activate and deactivate the time settings and sound activation mode. The sound activation mode has multiple, manual or automatic decimal level settings to adjust for unwanted environmental noises. The time period setting and sound activation mode will record each activation in a segment, time stamp it, mark it and number it for identification. This will allow the user to review files quickly listening briefly to the sound that activates that time segment then he can choose to listen or move on to another segment using a skip/mode button.

The recorder 19 has an internal memory for field review and external memory for review on other devices such as a phone or a computer. The device 2 also has the capacity to transfer files from the recorder's internal memory to other devices automatically like a phone or computer. The device 2 is also capable or be equipped with wireless data transfer. All memory will has the capability to transfer, save and erase files.

The digital recorder 19 has a control panel 14 for set up recording and file review. This includes multiple buttons, lights, LCD screens 16 with a spectrum analyzer, stereo headphone jack 125, speakers 18, and SD card 22 and slot 20. It also has at least one USB port 112. The device is capable to communicating with external devices such as a computer for internal memory file transfer and to change the recorders 19 functions. The recorder 19 has a normal speed and high speed playback mode and also has a skip/mode button. These functions are essential for the user to review the files quickly.

An external computer program is loaded onto the user's computer to review external files. The program has the capability to download the recorder's internal memory files. The program has the capability to communicate with the device to change the recorder's settings. The control panel of the external program has the controls to manipulate these functions. These functions control the program and include but are not limited to a spectrum analyzer, high speed playback, skip, stop, pause, fast forward, reverse, fast wind, play, erase, save, copy, paste and file transfer.

Another embodiment of the turkey sensor 2 requires the device 2 to have a higher capacity memory built into the device 2. This allows for longer duration of use without the need to change the SD card 22 to record sounds.

Another embodiment would incorporate an anemometer to indicate wind speed. When there is an increase in wind speed the recorder 19 is disabled so increased level of noise with the increase speed of wind will not be recorded. When the wind calms the device 2 will once again begin to record sound.

Another embodiment includes a light activated sensor, sound activation, spectrum analyzer and sound filter that lets the user select certain frequencies and exclude others in an attempt to focus on selected targets or animal's to be scouted.

In another embodiment the playback mode is set at an increased speed that allows the user to listen to long duration of recording in a shorten period of time without much loss of audible quality.

Another embodiment of the turkey sensor 2 has the outward appearance of the device resembling a tree surface.

Yet another embodiment has an opening or channel in the exterior through the device for accepting a security cable for securely attaching the turkey sensor to a tree so it can be locked to the tree.

One embodiment of the turkey sensor 2 has a timer. Another embodiment has a light sensor 150. The turkey sensor in yet another embodiment has playback capability.

Yet another embodiment excludes the recording aspect from the electronic circuitry to allow the user to select their own recording device based on affordability and application needs. An example of this is a spring gobbler hunter may only use the device to locate gobblers on the roost. This process only takes about 10 minutes daily and a low cost recording device would work well with some other embodiments not being necessary. This device 2 uses multiple parabolic microphones 24 with wind shields and is either multiple channel or single channel. All channels must be amplified. Sound filters are used to eliminate unwanted sounds. A programmable timer is used to activate and deactivate the time setting. There is a SD card 22 and slot 20 to record directly to the SD card 22 if applicable. Also the recorder 19 in compartment 120 will have an on board memory and USB port 112 for more external storage. There is a link to an electronic circuit 48 to connect the recorder 120. This embodiment like the others it battery powered and is capable of containing a recharging system with a recharging outlet 110 and charger built in. The external program controls will have push button controls and an LCD screen with time stamp for programming.

The external computer program is optional for cost and application purposes. The program can be setup to operate with external memory files or a SD card 22. The program will have a controls using most of the same functions as the other embodiments. The program has a high speed playback that can enhance a voice recording playback capabilities. The program can erase, save and move files. The program may be limited according to the user's voice recording selection. All embodiments have the same enclosure. Internally electronics and controls rest on the left side and the additional recorder is placed on the right side.

What is claimed is:

1. A method of scouting and locating wildlife, said method comprising;
   placing a sensing device at a desired wildlife location;
   activating said sensor device;
   after a predetermined period of time, deactivating said sensor device and relocating said sensor device to a different location in said wildlife location;
   reactivating said sensor device;
   after a predetermined period of time, collecting said sensor device and accessing said sensor device to determine wildlife activity collected by said sensor device wherein said sensor device is comprised of:
   a hinged housing comprising a front compartment and a back compartment; contained in said back component, an electrical power source and connected electrically to said electrical power source:
   controls;
   a display screen;
   at least one speaker;
   a digital recorder;
   an SD card with a SD card slot and, contained in said front compartment, at least one parabolic microphone;
   said housing having external means to attach said housing to a support.

2. A method as claimed in claim 1 wherein said controls also includes a timer.

3. A method as claimed in claim 1 wherein said controls also includes a light sensor.

4. A method as claimed in claim 1 wherein said sensor has playback capability.

5. A method as claimed in claim 1 wherein said sensor has recording capability.

6. A method of scouting and locating wildlife, said method comprising;
   placing a sensing device at a desired wildlife location;
   activating said sensor device;
   after a predetermined period of time, deactivating said sensor device and relocating said sensor device to a different location in said wildlife location;
   reactivating said sensor device;
   after a predetermined period of time, collecting said sensor device and accessing said sensor device to determine wildlife activity collected by said sensor device wherein said sensor device is comprised of:
   a hinged housing comprising a front compartment and a back compartment; contained in said back component, an electrical power source and connected electrically to said electrical power source:
   controls;
   at least one display screen;
   at least one speaker;
   a digital recorder;
   a recharger port;
   at least one USB port;
   a headphone port;
   an SD card with a SD slot and, contained in said front compartment, at least one parabolic microphone;
   said housing having external means to attach said housing to a support.

7. A method as claimed in claim 6 wherein said sensor is a parabolic microphone.

\* \* \* \* \*